UNITED STATES PATENT OFFICE.

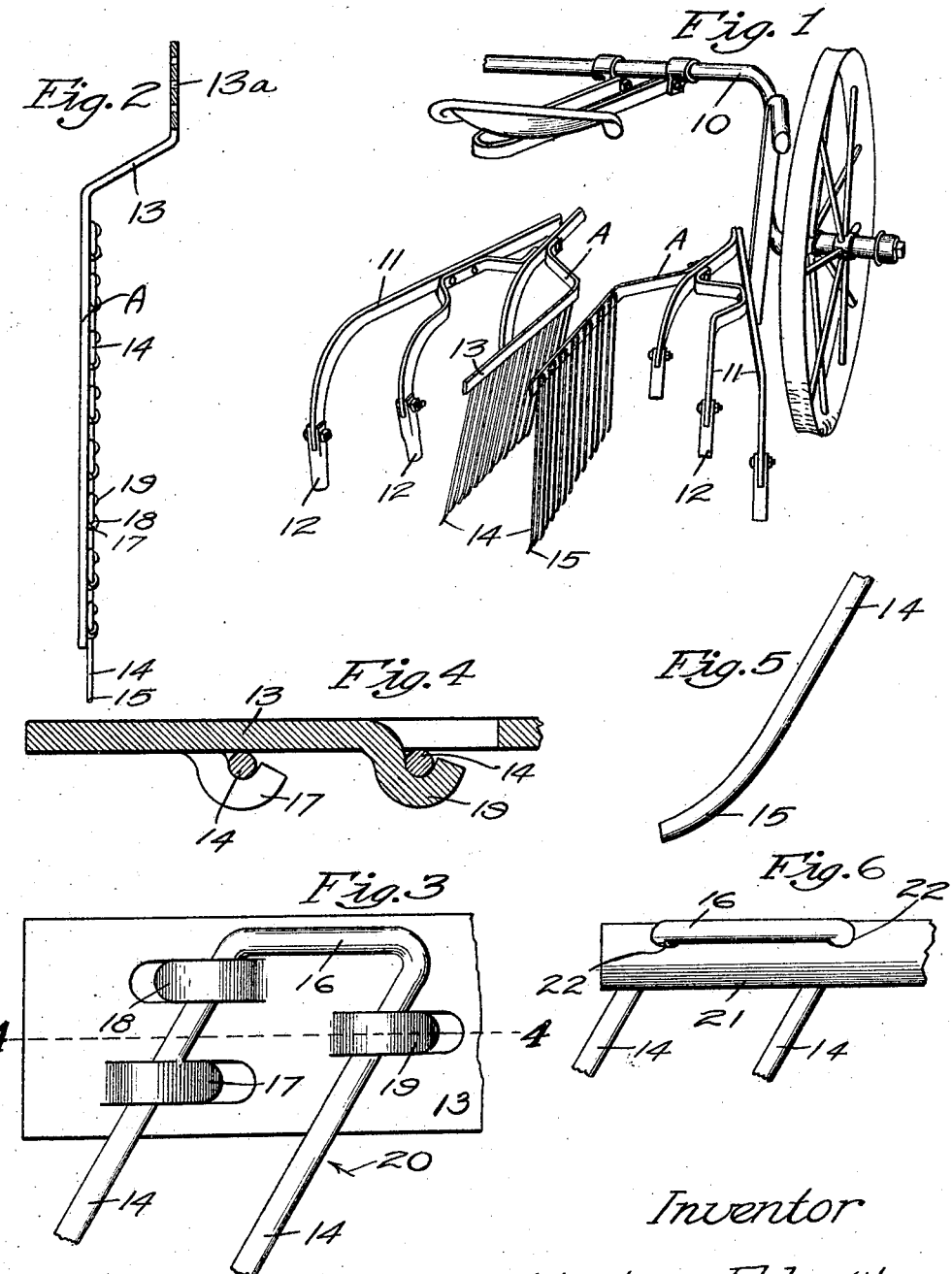

ABRAHAM F. MATTHEWS, OF POCAHONTAS, IOWA.

FENDER ATTACHMENT FOR CULTIVATORS.

1,413,127.  Specification of Letters Patent. Patented Apr. 18, 1922.

Application filed March 25, 1921. Serial No. 455,445.

*To all whom it may concern:*

Be it known that I, ABRAHAM F. MATTHEWS, a citizen of the United States, and a resident of Pocahontas, in the county of Pocahontas and State of Iowa, have invented a certain new and useful Fender Attachment for Cultivators, of which the following is a specification.

The object of my invention is to provide a fender attachment for cultivators or the like adapted to engage the ground adjacent to the corn rows for thoroughly pulverizing the ground adjacent thereto, the parts being of simple, durable and comparatively inexpensive construction.

More particularly, my invention relates to an attachment adapted to be fixed to the gang frames of a cultivator and adapted to permit a row of corn to pass therebetween, the fender attachment being provided with a plurality of rearwardly inclined fingers which engage the ground adjacent to the corn rows for thoroughly pulverizing the ground and for covering weeds and the like adjacent to the corn rows.

Still another object is to provide the fender with a plurality of resilient fingers, which are easily secured to the fender frame.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of a portion of a cultivator with my improved fender shown thereon.

Figure 2 is a top view of one of the fender members, parts being shown in section to better illustrate the construction.

Figure 3 is an enlarged, detail view showing how a pair of fingers are secured to the fender frame.

Figure 4 is a sectional view taken on the line 4—4 of Figure 3.

Figure 5 is an enlarged, detail view of the lower end of one of the resilient fingers; and Figure 6 is a slightly modified form of fender frame, showing how the fingers are secured thereto.

In the accompanying drawings, I have used the reference numeral 10 to indicate generally a cultivator, which is provided with gangs 11 and cultivator blades 12. Fixed to the gang frames 11 are my fender attachments A.

Each of my fender attachments includes a bar or the like 13, which are provided with openings $13^a$ whereby they may be secured to the cultivator by means of a bolt or the like.

By providing a series of openings $13^a$, I am able to move the entire fender attachment forwardly or rearwardly for getting a slight adjustment. This makes it possible to arrange the fender attachments in the position where the best results will be produced.

The bar 13 has its forward end bent or inclined, so that the pair of fender members may be substantially close together, while the ends which are fixed to the gangs 11 are spaced apart, as shown in Figure 1 of the drawings.

Fixed to the bar 13 are the resilient finger member 14. The finger members 14 extend downwardly and rearwardly and have their lower ends curved, as at 15, so that when the curved end 15 engages the ground, a runner-like effect will be provided, so as to permit the fender attachments to easily pass over uneven surfaces.

The fingers 14 are made in pairs and have their upper ends connected together by means of a cross piece 16, which is formed integral with the fingers 14; that is two of the fingers 14 and the cross piece 16 are bent out of a single rod or wire, so as to form a substantially inverted U-shaped member, as shown in Figure 3 of the drawings.

In order to secure the fingers to the bar 13, I provide tongues 17, 18 and 19, which are formed by pressing them from the bar 13. The tongues 7 and 18 engage one of the fingers, while the tongue 19 engages one of the other fingers of the entire member.

The tongue 18 is placed so that the portion 16 rests substantially thereon and so that the fixed part of the tongue 18 strikes the forward side of the finger, as shown in Figure 3 of the drawings.

The fixed side of the tongues 17 and 19 also strike the rear side of one of the fingers 14.

The peculiar construction of the tongue members 17, 18 and 19 and their arrangement provides a very efficient means for holding the finger members 14 to the bar 13.

It will be understood that the only movement of the fingers 14 is in the direction indicated by the arrow 20 and the arrangement of the tongue 18 is so that its fixed side strikes against the forward sides of the fingers 14 and the arrangement of the tongues 17 and is so that their fixed side strikes against the rear side of the fingers 14, and the arrangement of the tongue 19 is so that its fixed side strikes against the forward side of the finger 14, giving me a construction, which will properly hold the fingers 14 in position.

In Figure 6 of the drawings, I have shown a slightly modified form of device in which instead of the bar 13, I use a tube or pipe 21, which is provided with a series of openings 22, through which is extended the fingers 14, thus securing them to the pipe 21.

In the practical operation of my device, the fender attachments are secured to the cultivator as shown in Figure 1 of the drawings.

The cultivator blades in throwing the ground causes the ground to be moved towards the row of corn. The fingers 14 which engage the ground, which have been thrown or moved towards the row of corn causes the ground to be more thoroughly worked or pulverized.

The arrangement of the fingers 14 permits me to work the ground very close to the row of corn, thus destroying weeds which are close to the row of corn, and which are injurious to the corn.

The fingers 14 being resilient and spaced apart permit the fine dirt to be sifted or passed through the fingers and at the same time the larger lumps of dirt are worked to such an extent that only the fine dirt is moved up against the row of corn.

In the actual use of my fender attachments, I have found that the corn could be better cultivated than heretofore and that the weeds close to the rows of corn would be turned under and fine dirt would be moved up against the rows of corn.

Some changes may be made in the arrangement and construction of my improved device without departing from the essential features and purposes of my invention, and it is my intention to cover by my claim any modified forms of structure or use of mechanical equivalents, which may be reasonably included within its scope.

I claim as my invention:

A pair of fender attachments for cultivators and the like, consisting of a right and a left fender, each comprising a frame fixed at one end to the gang of the cultivator and extended rearwardly therefrom, a plurality of resilient fingers having their lower ends curved so as to provide a runner-like effect when passing over the ground, the fingers being inclined from front to rear, said fingers being arranged in pairs and having their upper ends connected together so as to form an inverted U, and means for fastening said fingers to the frame, said means including a pair of alternated tongues arranged to overlap one of the fingers of the pair and a tongue arranged to overlap the other finger of the pair of fingers, the parts being so arranged that the fenders are spaced apart for permitting them to pass along each side of a row of corn, whereby the ground adjacent to the row of corn will be engaged and pulverized by said fenders.

Des Moines, Iowa, March 17, 1921.

ABRAHAM F. MATTHEWS.